Dec. 17, 1946.   R. C. SANDERS, JR., ET AL   2,412,632
RADIO BOMB RELEASE SYSTEM
Filed March 2, 1944   4 Sheets-Sheet 1
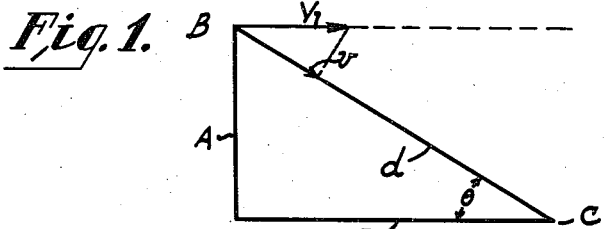
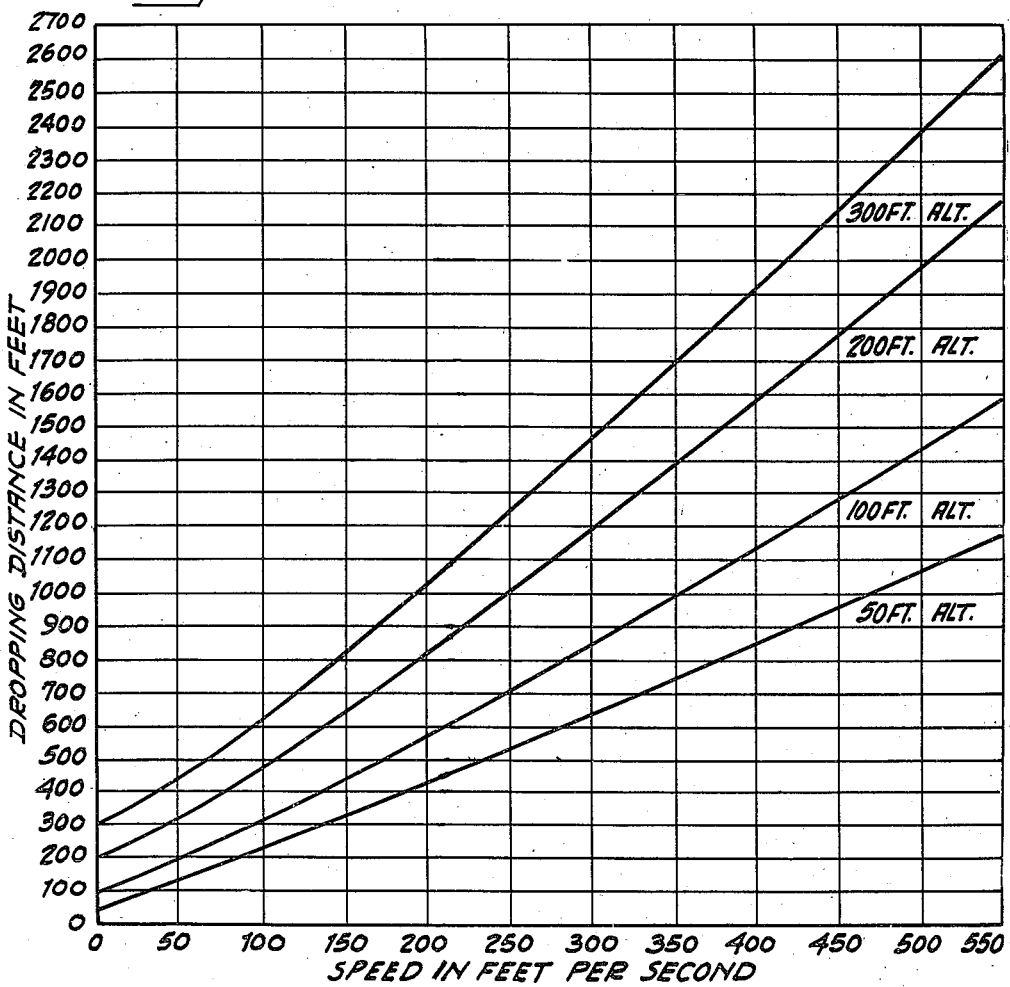
INVENTORS
ROYDEN C. SANDERS JR.
& WILLIAM R. MERCER
BY
ATTORNEY Dec. 17, 1946. R. C. SANDERS, JR., ET AL 2,412,632
RADIO BOMB RELEASE SYSTEM
Filed March 2, 1944  4 Sheets-Sheet 2

INVENTORS
*ROYDEN C. SANDERS JR.*
& *WILLIAM R. MERCER*
BY *C&Ruska*
ATTORNEY

INVENTORS
ROYDEN C. SANDERS JR.
& WILLIAM R. MERCER
BY
ATTORNEY

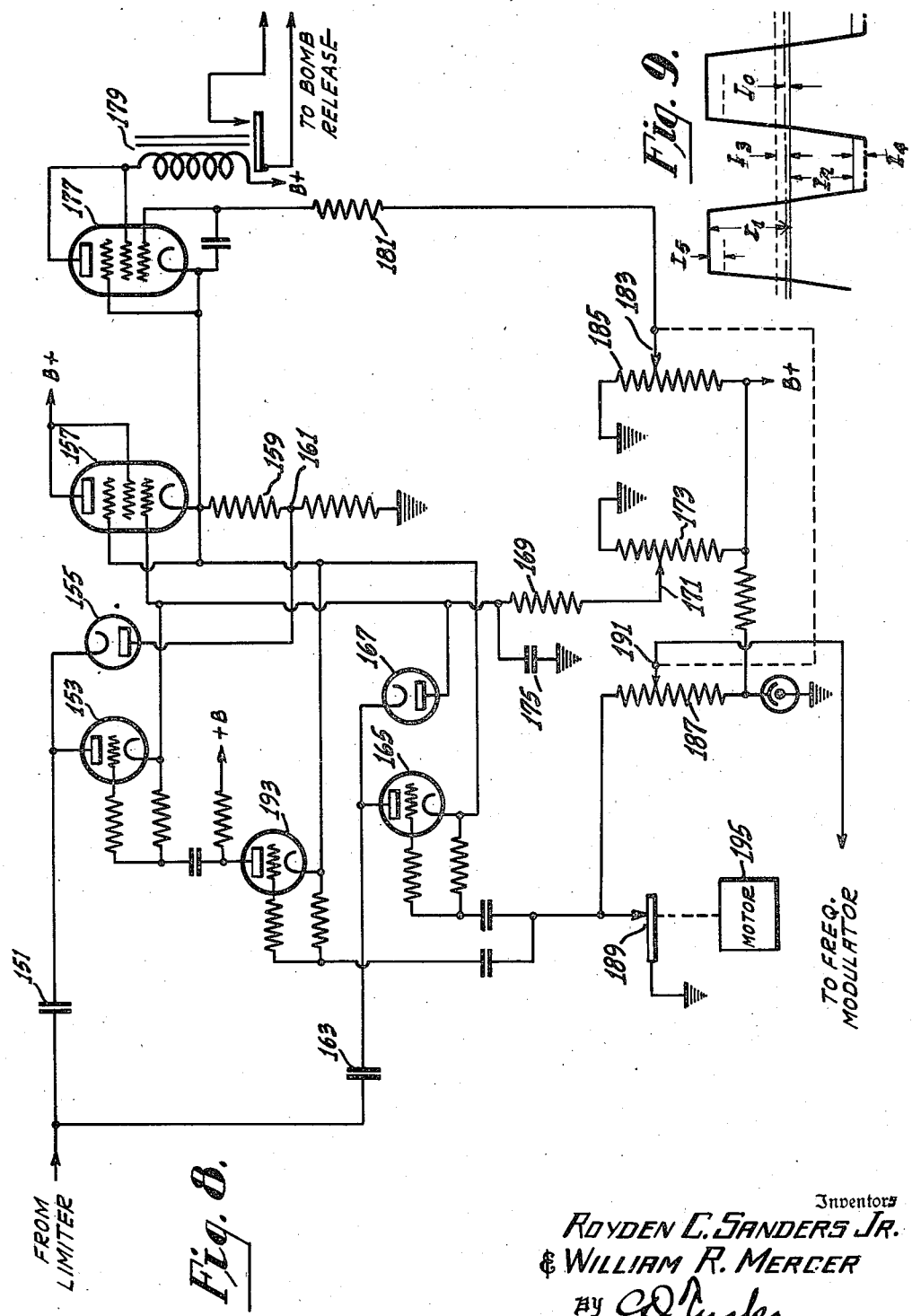

Patented Dec. 17, 1946

2,412,632

UNITED STATES PATENT OFFICE 2,412,632

RADIO BOMB RELEASE SYSTEM

Royden C. Sanders, Jr., and William R. Mercer, Hightstown, N. J., assignors to Radio Corporation of America, a corporation of Delaware Application March 2, 1944, Serial No. 524,794

10 Claims. (Cl. 250—1)

This invention relates to bomb release apparatus, and more particularly to improvements in systems of the type described in copending U. S. application Serial No. 524,795 filed by Royden C. Sanders, Jr., on the same date as this application and entitled Radio bomb release system.

The principal object of this invention is to provide a method of and means for energizing a bomb release mechanism in response to radio reflection distance and speed measuring means.

Another object of the invention is to provide a method of and means for electrically computing the measured distance from the target at which the missile is to be released in order to hit.

A further object is to provide an improved method of and means for measuring the speed of an aircraft relative to an object on the surface.

Figure 3:
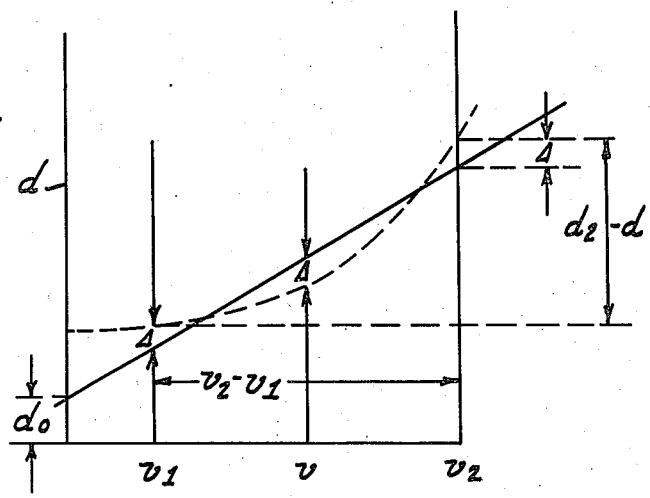
Figure 4:
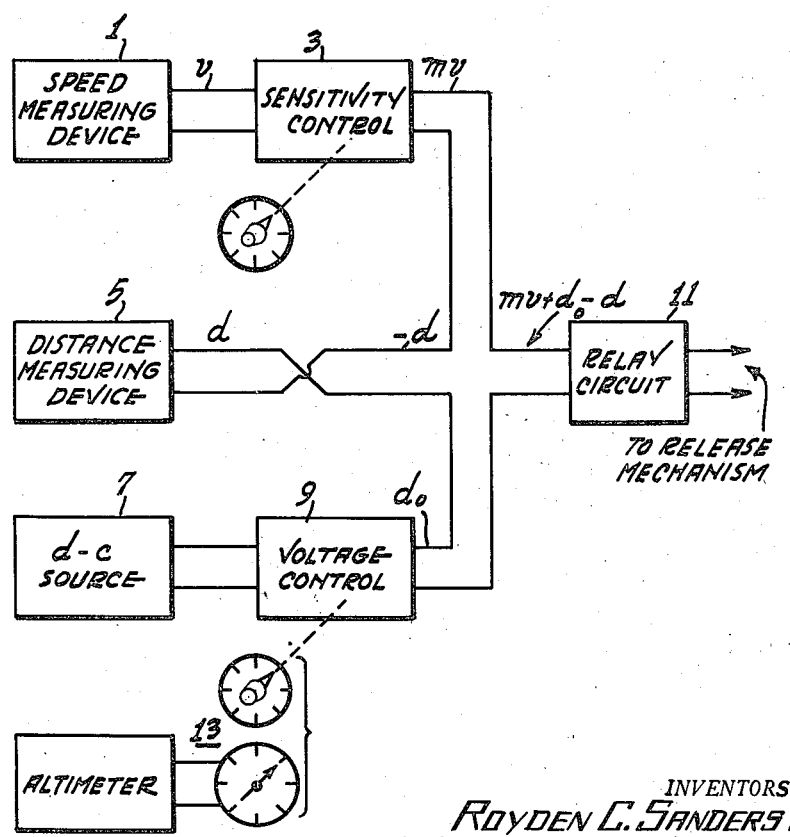
Figure 5:
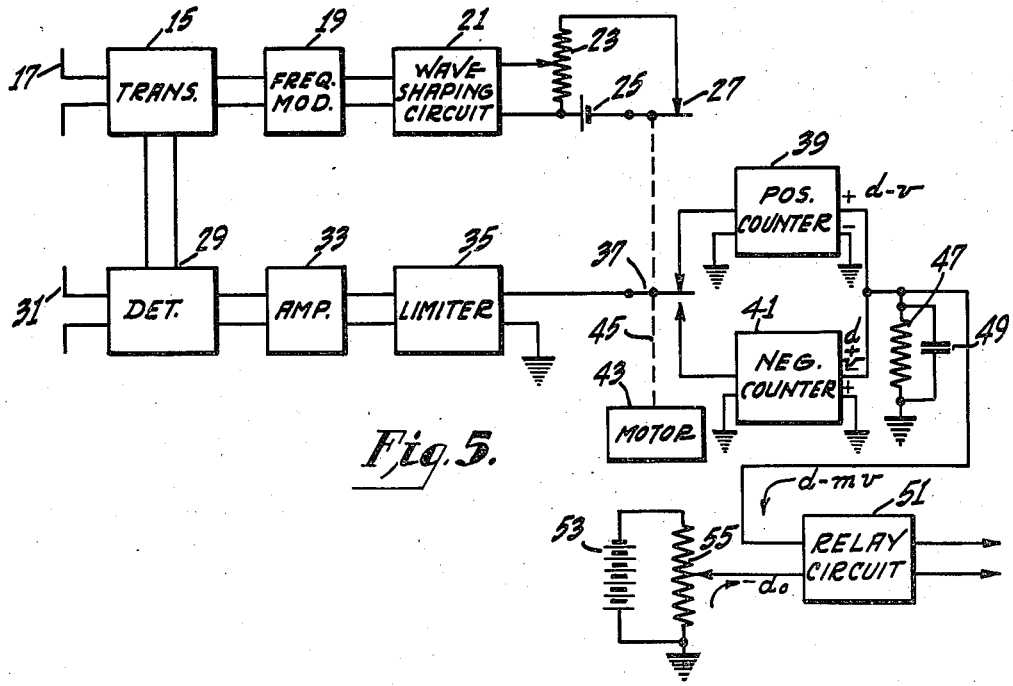
Figure 6:
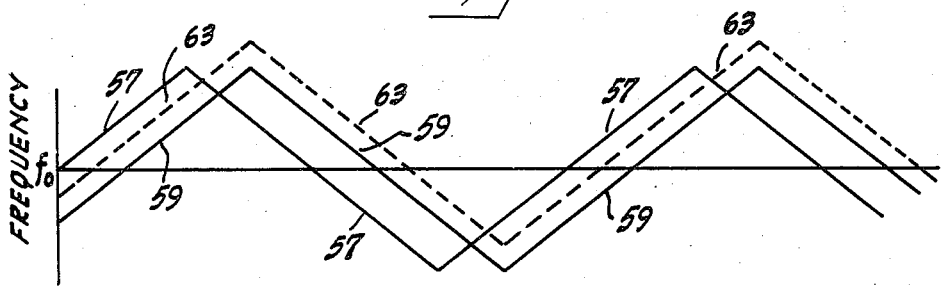
Figure 7:
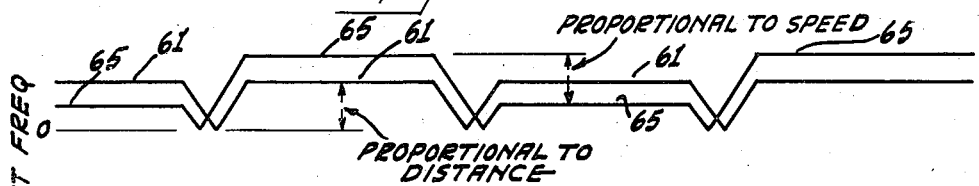

These and other objects will become apparent to those skilled in the art upon consideration of the following description, with reference to the accompanying drawings, of which Figure 1 is a schematic diagram illustrating a bomb release problem, Figure 2 is a group of graphs illustrating relationships between speed, distance, and altitude in the solution of the problem of Figure 1, Figure 3 illustrates the determination of the linear approximation to one of the curves of Figure 2, Figure 4 is a schematic block diagram of a system for performing the required functions of speed and distance measuring and computation of release distance for a given altitude, Figure 5 is a schematic block diagram of a modification of Figure 4, Figure 6 is a group of graphs illustrating the variations in frequency of energy radiated and received by the system of Figure 5, and Figure 7 is a group of graphs illustrating beat frequencies produced in the operation of the system of Figure 5, Figure 8 is a schematic diagram of a counter and combining circuit applicable to the system of Figure 5, and Figure 9 is a graph showing the variations in current during operation at points in the circuit of Figure 5 and 8.

Referring to Figure 1, a bomb is to be released from an airplane at the point B, flying at an altitude A, at the proper point to strike a target at the point C. Assuming free fall of the bomb, $$A = \tfrac{1}{2}gt^2$$

where A is the altitude, $g=32.2$ feet per second and $t$ is the time of fall.

$$t=\sqrt{\frac{2A}{32.2}}=\frac{\sqrt{A}}{4.01} \text{ seconds}$$

The horizontal distance D from the target at which the bomb must be released is thus:

$$D=V\frac{\sqrt{A}}{4.01}$$

where V is the horizontal component of the speed of the airplane with respect to the target. In other words, for any specific altitude there is a particular relationship between V and D which must exist at the instant the bomb is released.

By means of radio reflection equipment, such as an altimeter of the F-M type, the altitude A may be measured continuously. Similarly, the slant distance $d$ (Figure 1) to the target may be measured. The slant velocity $v$ can also be determined continuously by this type of equipment, as described hereinafter. Since the equipment measures the slant distance and the slant speed relative to the target rather than the horizontal distance and horizontal speed, it is necessary to determine the point of release in terms of these quantities.

The horizontal distance to the target is given by $$D=Vt \tag{1}$$

but $$D=d\cos\theta \tag{2}$$

and $$V=\frac{v}{\cos\theta} \tag{3}$$

Substituting in Equation 1

$$d\cos\theta=\frac{v}{\cos\theta}t \tag{4}$$

$$\therefore d=\frac{vt}{\cos^2\theta} \tag{5}$$

where $D=$horizontal distance
$V=$horizontal speed
$A=$altitude
$t=$time of fall
$v=$slant speed relative to target
$d=$slant distance to target In order to get the result in terms of slant distance and slant speed rather than angle $$A^2 + D^2 = d^2$$

$$\cos\theta = \frac{D}{d}$$

and $$\cos^2\theta = \frac{D^2}{d^2}$$

and $$D^2 = d^2 - A^2$$

$$\therefore \cos^2\theta = \frac{d^2 - A^2}{d^2}$$

Substituting in Equation 5

$$d = \frac{vtd^2}{d^2 - A^2}$$

$$d^3 - dA^2 = vtd^2$$

and $$d^2 - vtd - A^2 = 0 \quad (6)$$

a quadratic equation, the solution of which is $$d = \frac{vt}{2} + \sqrt{\left(\frac{v}{2}t\right)^2 + A^2} \quad (7)$$

where $$t = \frac{\sqrt{A}}{4.01}$$

Since the equipment will require a certain finite time $T$ to operate and release the bomb after the relationship of Equation 7 is established, the dropping distance $d$ must be increased accordingly, by adding to the time of fall $t$ the delay time $T$:

$$d = \frac{v}{2}\left(\frac{\sqrt{A}}{4.01} + T\right) + \sqrt{\left(\frac{v}{2}\frac{\sqrt{A}}{4.01} + T\right)^2 + A^2} \quad (8)$$

In practice, the delay time $T$ may be of the order of 0.4 second. The value must be determined for the particular equipment used.

A series of curves of slant speed vs. slant dropping distance, for different altitudes may be plotted from Equation 8. Figure 2 shows a typical group of such curves. The curves do not pass through zero because they are based on slant speed and slant distance. When the airplane is directly above the target, the distance to the target is the altitude, rather than zero.

In the system of the present invention, a straight line approximation to the curves of Figure 2 is used, rather than the actual non-linear relation between speed and distance. Figure 3 shows one of the curves of Figure 2, plotted (dash line) on a different scale so as to accentuate the non-linearity. To obtain the best approximation to the curve, a range of speeds most likely to be used is selected. The lower and upper limits of this range are designated $v_1$ and $v_2$, respectively, in Figure 3. The corresponding dropping distances, determined from Equation 8, are $d_1$ and $d_2$. The solid line, representing the linear approximation, is drawn with a slope $$m = \frac{d_2 - d_1}{v_2 - v_1}$$

and in a position such that its maximum deviation $\Delta$ from the dash curve is a minimum over the selected speed range.

The equation of the linear approximation is $$d = mv + d_0 \quad (9)$$

where $d_0$ is the distance intercept, indicated in Figure 3. The constants $m$ and $d_0$ are different for each altitude.

Refer to Figure 4. A speed measuring device 1, capable of providing a D.-C. output voltage proportional in magnitude to the slant speed $v$, is connected to a sensitivity control 3. The device may be of the radio reflection type, described hereinafter. The sensitivity control may be an attenuator connected in the output circuit of the device 1, or any other means for varying the proportionality constant $m$ between the D.-C. output voltage and the speed $v$.

A distance measuring device 5, arranged to provide D.-C. output proportional in magnitude to the slant distance $d$, has its output circuit connected in series with that of the control 3 in opposing polarity, so that equal changes in the two outputs would produce no change in their sum. The device 5 may also be of the radio reflection type, similar in construction and operation to an F-M altimeter.

A D.-C. source 7 is also connected in series with the outputs of the devices 3 and 5, through a voltage control 9. The algebraic sum of the three output voltages is applied to a relay device 11, which, for the sake of simplicity in explanation, is assumed to operate upon the occurrence of zero voltage at its input circuit, although in fact it may be designed to operate at any predetermined voltage, providing an additional voltage is supplied to it so that operation will occur when the algebraic sum of the outputs of the devices 3, 5 and 9 is zero.

The controls 3 and 9 are adjustable in accordance with the altitude at which a bombing run is to be made to positions corresponding to the constants $m$ and $d_0$, respectively. An altimeter 13, which may be of the above-mentioned radio reflection type, is provided to enable the pilot to maintain the altitude to which the controls 3 and 9 set. The controls may be ganged to a single manually operable knob, or automatically operated from the altimeter by means of a servo system, not shown.

In the operation of the system, the controls 3 and 9 are set as described above, and the aircraft is flown toward the target. The total voltage applied to the relay circuit 11 is proportional to $mv + d_0 - d$. As the target is approached, the component corresponding to $d$ will decrease with decrease in the slant distance. The component corresponding to $mv$ will ordinarily decrease also, although at a varying rate, because of decrease in the value of cosine $\theta$ (see Figure 1) as the target is approached. When the condition of Equation 9

$$d = mv + d_0$$

is reached, the total voltage applied to the relay circuit 11 is zero, and the bomb is released. Providing the azimuth (horizontal direction of flight) is correct, the bomb will strike the target, within the limit of error of the linear approximation. The magnitude of this error is greatest at the highest altitude. At an altitude of 300 feet the maximum error over the range of 110 ft./sec. to 500 ft./sec. (slant speed) is plus or minus 12 feet.

The functions of speed measuring and distance measuring may be combined in one system, using a frequency modulated signal. Referring to Figure 5, a transmitter 15 is coupled to an antenna 17 and arranged to be varied cyclically in frequency by means of a frequency modulator 19, which may be of the vibratory variable capacitor type described in copending U. S. application Serial No. 471,003, filed January 1, 1943, by S. V. Perry and entitled Capacity modulator unit. The modulator 19 is connected to be energized by the output of a wave shaping circuit 21, which is connected through an adjustable voltage divider 23 to a battery 25 and a periodically operable switch 27. The circuit 21 is of the type described in copending U. S. application Serial No. 512,153 filed November 29, 1943, by Irving Wolff and entitled Vibratory mechanical systems, and is designed in accordance with the mechanical characteristics of the modulator 19 to provide substantially linear triangular wave variation of the capacitance thereof in response to square-wave input to the wave shaping circuit.

A detector 29, preferably of the balanced type described in copending U. S. application Serial No. 445,720 filed June 4, 1942, by R. C. Sanders, Jr., and entitled Frequency modulated altimeter or distance indicator, although any suitable beat detector may be used, is connected to a receiving antenna 31 and to the transmitter 15. The output of the detector 29 is applied through an amplifier 33 to a limiter 35. The output circuit of the limiter 35 is connected through a double throw switch 37 to a pair of frequency responsive devices 39 and 41, which may be averaging cycle counters or other means for providing D.-C. output proportional in magnitude to the frequency of an A.-C. input. The switch 37 is mechanically coupled to the switch 27, so that the limiter output is applied to the counter 39 while the switch 27 is closed, and to the counter 41 while the switch 27 is open. The switches 27 and 37 are connected to a motor 43 for periodic actuation thereby, as schematically indicated by the dash line 45.

The counter 39 is connected so as to provide an output voltage which is positive with respect to ground and which increases with increase in input frequency. The counter 41 is connected to provide an output voltage which is negative with respect to ground and which increases with increase in input frequency, but at a lower rate than that of the counter 39. The output circuits of the counters 39 and 41 are connected to a common load resistor 47 which is bypassed by a capacitor 49 and connected to a relay circuit 51. A D.-C. source 53 is also connected to the relay circuit 51, through an adjustable voltage divider 55, so that the output of the voltage divider is added to the voltage across the load resistor 47.

The operation of the system of Figure 5 is as follows: The motor 43 operates the switch 27, cyclically connecting the battery 25 across the voltage divider 23 and thus providing a square wave input to the wave shaping circuit 21. The output of the circuit 21 actuates the frequency modulator 19, varying the frequency of the transmitter 15 cyclically and linearly with respect to time, as illustrated by the graph 57 of Figure 6. A small portion of the output of the transmitter 15 is applied directly to the detector 29, and the remainder is radiated by the antenna 17. Some of the radiated energy strikes the target (not shown) and is reflected to the receiving antenna 31. The antennas 17 and 31 are preferably both directive, to avoid the effects of reflection by objects other than the desired target.

Assuming that the distance of the target from the antennas 17 and 31 remains constant, the reflected signal picked up by the antenna 31 will vary in frequency over the same range as the transmitted signal. Since the radiated energy requires a finite time to travel from the transmitter to the target and back to the receiver, the received signal is delayed with respect to the transmitted signal, and the variation in frequency of the received signal will follow that of the transmitted signal by an interval proportional to the distance as shown by the graph 59 in Figure 6. Thus the transmitted and received signals will constantly differ in instantaneous frequency by an amount proportional to the distance, causing the detector 29 to produce a beat output of the difference frequency, as indicated by the graph 61 of Figure 7. The beat frequency is $$f_r = \frac{Sf_m d}{246}$$

cycles per second, where $S$ is the sweep width, or range of variation of frequency of the transmitted signal in megacycles per second per sweep, $f_m$ is the modulating frequency in cycles per second, and $d$ is the distance in feet.

If the equipment is on a vehicle which is moving toward the target, the received signal is shifted by Doppler effect to a higher frequency by an amount proportional to the velocity, as shown by the dash line 63 of Figure 6. The beat frequency is correspondingly decreased during the periods that the transmitted signal increases in frequency, and increased during the periods that the transmitted signal decreases in frequency, providing a beat frequency output from the detector 29 which varies as indicated by the graph 65 of Figure 7. The average beat frequency is proportional to the distance, and the range of variation of the beat frequency is proportional to the velocity. The change in frequency caused by Doppler effect is $$\frac{2f_0 v}{C}$$

cycles per second, where $f_0$ is the carrier frequency, $v$ is the radial velocity in feet per second relative to the target, and $C$ is the wave propagation velocity in feet per second.

The beat frequency output of the detector 29 is amplified by the amplifier 33 and limited to a constant amplitude by the limiter 35. The output of the limiter 35 is applied through the switch 37 to the positive counter 39 during increase of frequency of the transmitted signal, and to the negative counter 41 during decrease of frequency of the transmitted signal. The output of the counter 39 corresponds in magnitude to the beat frequency during increase of transmitted frequency, and is the difference between two components proportional to distance and to speed respectively. The output of the counter 41 corresponds in magnitude to the beat frequency during decrease of frequency of the transmitted signal and is the sum of two components proportional to distance and to speed respectively. If the two counters were of equal sensitivity, the portions of their outputs corresponding to distance would cancel in the resistor 47, and the voltage across the resistor 47 would be proportional to speed. However, as stated above, the sensitivity of the counter 39 is greater than that of the counter 41. See Figure 9, wherein the average current $I_0$ through the resistor 47 is analyzed to show the average component $I_1$ of current during modulation upsweep due to distance only, the average component $I_2$ of current during downsweep due to distance only, the resultant average component $I_3$ of current due to distance, the increase $I_4$ in negative average component of current during downsweep due to speed, and the decrease in positive average component of current during upsweep due to speed. Accordingly, the total current through the resistor 47, and hence the voltage across it, is proportional to $$d - muv$$

where $m$ depends upon the ratio of the sensitivities of the counters 39 and 41 and upon the relative responses of the system, in beat frequency cycles per second, to distance and to speed.

The carrier frequency $f_0$, which determines the speed sensitivity, and the modulation frequency $f_m$, which, together with the band width S, determines the distance sensitivity, are predetermined in accordance with practical considerations not directly related to the values of $m$ which will be required. The counter sensitivities are then determined so as to provide the various desired values of $m$ by variation of the band width S over a predetermined range. Thus in the operation of the system, the constant $m$ is adjusted in accordance with altitude, by means of the voltage divider 23. The voltage across the resistor 47 is proportional to $d-mv$. The voltage divider 55 is adjusted, also in accordance with altitude, to provide a voltage bearing the same proportionality to $-d_0$. The total voltage applied to the relay circuit 51 is proportional to $d-mv-d_0$. When this voltage becomes zero, the condition of Equation 9, $d=mv+d_0$, is satisfied, and the bomb release mechanism is actuated.

Figure 8 shows a preferred circuit for performing the functions of the switched counters of Figure 5. The circuit of Figure 8 combines the outputs of the preferred counter arrangements to determine the point of release as described above. The beat frequency input voltage from the limiter, not shown, is applied through a capacitor 151 to the anode of a triode 153 and to the cathode of a diode 155. The cathode of the tube 153 is connected to the control grid of a pentode tube 157 which is provided with a load resistor 159 in its cathode circuit. The anode of the diode 155 is connected to a tap 161 on the resistor 159. The input circuit is also coupled through a capacitor 163 to the anode of a triode 165 and to the cathode of the diode 167. The cathode of the tube 165 is connected to the cathode of the tube 157, and the anode of the diode 167 is connected to the control grid of the tube 157. The control grid of the tube 157 is returned through a resistor 169 to a tap 171 on a voltage divider 173, which is connected between the positive anode supply source B+ and ground. A capacitor 175 is connected between the control grid of the tube 157 and ground. The cathode of the tube 157 is connected to the cathode of an amplifier tube 177. A relay 179 is included in the anode circuit of the tube 177. The control grid of the tube 177 is connected through a resistor 181 to an adjustable tap 183 on a voltage divider 185 which is connected between B+ and ground.

An adjustable voltage divider 187 is connected to the B+ terminal and through a switch 189 to ground. The adjustable tap 191 is connected to the frequency modulator circuit, not shown in Figure 8, and is mechanically ganged with the movable contact 183 on the voltage divider 185. The switch 189 is coupled to the control grid of the triode 165, and through a phase inverter tube 193 to the control grid of the triode 153. The switch 189 is mechanically coupled to a motor 195.

The operation of the system of Figure 8 is as follows: The motor 195 operates the switch 189 periodically to ground and unground alternately the upper end of the voltage divider 187, causing the voltage at this point to alternate between ground potential and substantially B+ potential. This square wave voltage is applied to the control grid circuit of the tube 165 and through the phase inverter 193 to the control grid circuit of the tube 153, causing the tubes 153 and 165 to become conductive and non-conductive alternately with respect to each other. A similar square wave voltage of lower amplitude appears at the tap 191 and is applied to the frequency modulator, causing the frequency of the transmitter to increase while the switch 189 is open and to decrease while the switch 189 is closed.

When the switch 189 is closed the tube 153 is conductive and acts as a diode, charging the capacitor 175 during the positive half cycles of the beat frequency input wave. The capacitor 151 is discharged through the diode 155 during negative half cycles of the input voltage. These operations tend to charge the capacitor 175 to a voltage positive with respect to ground and proportional in magnitude to the frequency of the input voltage. When the switch 189 is open, the tube 165 is conductive and functions as a diode. During negative half cycles of the beat frequency input, the capacitor 175 is charged through the diode 167 and the capacitor 163. During positive half cycles the capacitor 163 is discharged through the tube 165. This operation tends to charge the capacitor 175 to a voltage negative with respect to ground and proportional in magnitude to the frequency of the input voltage. This action occurs only when the tube 165 is conductive since the capacitor 163 must be discharged after each beat frequency cycle in order for the counter operation to take place.

Thus during the periods while the transmitter frequency is increasing, the condenser 175 tends to become charged positively and during the periods when the transmitter frequency is decreasing, it tends to become charged negatively. The average voltage across the capacitor 175 is a function of the difference between the beat frequencies produced between the modulation upsweep and the modulation down-sweep, as described above in connection with Figure 1. The relative sensitivities of the counter circuits 153, 155 and 165, 167 are determined by the capacitances of the condensers 151 and 163 respectively.

The voltage across the capacitor 175 is applied to the control grid of the tube 157. The tube 157 functions as a cathode-follower type amplifier, automatically adjusting its anode current to a value such that the drop across the resistor 159 is substantially equal to the voltage between the control grid and ground. The voltage across the resistor 159 is thus substantially the same as that across the capacitor 175 but it is presented by a source of much lower impedance and, therefore, of better regulation characteristic. This voltage is applied to the cathode of the tube 165 to improve the linearity of counter operation by discharging the capacitor 163 after each count to a value closely approximating the voltage across the capacitor 175 rather than to zero voltage. The anode of the diode 155 is returned to the resistor 159 for the same reason, but to the intermediate point 161 which is slightly less positive than the cathode of the tube 165. This is necessary to prevent the diode 155 from becoming continuously conductive and failing to operate properly.

The cathode voltage of the tube 157 is also applied to the cathode of the tube 177. As long as the cathode of the tube 177 remains positive with respect to the control grid, the tube 177 is cut off and the relay 179 is de-energized and remains open. When the voltage at the cathode of the tube 179 becomes equal to or slightly negative with respect to the grid voltage, the tube 177 conducts, operating the relay 179. A positive voltage is applied to the lower end of the counter load resistor 169 from the tap 171 of the voltage divider 173 so that the charging of the capacitor 175 starts from a predetermined positive potential, rather than from zero. The potentials of the cathodes of the tubes 157 and 177 vary similarly with respect to a similar positive reference potential. The taps 183 and 191 on the voltage dividers 185 and 187, respectively, are adjusted to positions determined by the altitude at which the equipment is to be used, and control the quantities $d_0$ and $m$ respectively of Equation 9 set forth above. When the counter outputs are such that the voltages at the cathode and the control grid of the tube 177 are equal, the conditions represented by Equation 9 for the particular altitude are fulfilled and the relay 179 is operated.

The invention has been described as a radio speed measuring system in which a frequency modulated wave is radiated, reflected from the object with respect to which the speed is to be determined, heterodyned with the transmitted wave and the resulting beat frequencies combined separately during the up-sweep and the down-sweep of the frequency modulation cycle. Doppler effect causes a shift in the received signal frequency during both the up-sweep and down-sweep periods, alternately increasing and decreasing the beat frequency. The range of this variation is a measure of the speed. By altering the sensitivity of the system during the up-sweep period with respect to that of the down-sweep period, the system may be adapted to afford an indication of the occurrence of the predetermined relationship between the distance to the reflecting object and the speed of approach. An embodiment of the invention has been described wherein this effect is utilized to control automatically the dropping of a bomb from an aircraft.

We claim as our invention:

1. A radio bomb release system including means for radiating a frequency modulated signal to a reflecting target, means for receiving said signal after reflection and detector means for combining said received signal with said transmitted signal to produce a beat signal, frequency responsive counter means for producing a direct current output proportional in magnitude to the frequency of an input thereto, second frequency responsive counter means for producing a second direct current output differently proportional in magnitude to the frequency of an input thereto, and of opposite polarity to the current produced by said first counter means, means for applying said beat signal to said first counter means during increase of frequency of said transmitted signal and to said second counter means during decrease of frequency of said transmitted signal, a common load resistor connected to both of said counter means, and relay means connected to said load resistor.

2. The invention as set forth in claim 1, including a source of D.-C. voltage of adjustable magnitude connected in series with said load resistor.

3. A system for measuring the speed of a mobile craft with respect to a reflecting object, comprising means for radiating a frequency modulated signal, means for receiving said signal after reflection by said object, detector means for combining said radiated and said received signal to produce a beat frequency signal, frequency responsive counter means connected to said detector means to produce a D.-C. voltage proportional in magnitude to the frequency of said beat frequency signal, second frequency responsive counter means connected to said detector means to produce a D.-C. voltage proportional in magnitude to the frequency of said beat frequency signal but opposite in polarity to the output of said first mentioned counter means, a common load circuit connected to said first and second counter means, means for preventing operation of one of said counters during increase in frequency of said transmitted signal, and means for preventing operation of the other of said counters during decrease in frequency of said transmitted signal.

4. An automatic bomb release system for aircraft including means for producing an A.-C. signal which changes cyclically in frequency about a mean value which corresponds to the distance of a craft from a target, and over a range of frequency corresponding in width to the velocity of said craft with respect to said target, a pair of frequency responsive counter means, means for applying said signal to said counter means, a relay circuit, means for applying the outputs of said counter means in opposition to each other to said relay circuit, means for preventing operation of one of said counter means during periods when the frequency of said signal is greater than said mean value, and means for preventing operation of the other of said counter means during periods when the frequency of said signal is less than said mean value.

5. The invention set forth in claim 4 wherein each of said counter means includes a pair of electron discharge tubes, each including at least an anode, and a cathode, an input capacitor connected to the anode of one of said tubes and to the cathode of the other of said tubes, discharge circuits connected to the other anode and to the other cathode respectively, at least one of said discharge tubes including a control grid.

6. The invention as set forth in claim 4, wherein said means for alternately preventing operation of said counter means includes a source of substantially square wave voltage, means for applying said voltage directly to one of said counter means, and phase inverter means for applying said voltage in opposite phase to the other of said counter means.

7. The method of providing response to a predetermined relationship between speed and distance with respect to a reflecting object, including the steps of transmitting a frequency modulated signal to said reflecting object, receiving said signal after reflection, combining said received signal with said transmitted signal to produce a beat signal, deriving from said beat signal during increase in frequency of said transmitted signal a D.-C. voltage proportional to the frequency of said beat signal, deriving from said beat signal during decrease of frequency of said transmitted signal a second D.-C. voltage proportional to the frequency of said beat signal but of opposite polarity to said first D.-C. voltage, combining said first and second D.-C. voltages to provide a resultant D.-C. voltage having an average magnitude proportional to the algebraic sum of said first and second D.-C. voltages and effecting response to the attainment by said resultant voltage of a predetermined magnitude.

8. A system for providing response to a predetermined relationship between the speed and the distance of a mobile craft with respect to a reflecting object, including means for radiating a frequency modulated signal, means for receiving said signal after reflection by said object, detector means for combining said radiated and said received signal to produce a beat frequency signal, frequency responsive counter means connected to said detector means to produce a D.-C. voltage proportional to the frequency of said beat frequency signal, second frequency responsive counter means differing in sensitivity from said first counter means and connected to said detector means to produce a D.-C. voltage proportional to the frequency of said beat frequency signal but opposite in polarity to said first D.-C. voltage, a common load circuit connected to said first and second counter means, means for preventing operation of one of said counters during increase in frequency of said transmitted signal, and means for preventing operation of the other of said counters during decrease in frequency of said transmitted signal.

9. A system for providing response to a predetermined relationship between speed and distance, including radio transmitter means, frequency modulator means connected to said transmitter for cyclically varying the frequency of operation thereof, receiver means including a demodulator connected to said transmitter to provide a beat frequency output in response to reflection of signals radiated by said transmitter, frequency responsive counter circuits coupled to said demodulator means to provide D.-C. outputs having magnitudes of different proportionalities to the frequency of said beat frequency voltage and opposite polarities, means for alternately rendering said counter circuits inoperative, and means for combining the outputs of said counter circuits to provide a D.-C. voltage proportional in average magnitude to the algebraic sum of the outputs of said counter circuits.

10. The invention as set forth in claim 8, including a relay device and source of D.-C. voltage of adjustable magnitude connected in series with said common load circuit.

ROYDEN C. SANDERS, Jr.
WILLIAM R. MERCER.